Aug. 31, 1937.  L. V. WHISTLER  2,091,724
OPERATION STEP CONTROLLER
Filed Jan. 31, 1936  5 Sheets-Sheet 2
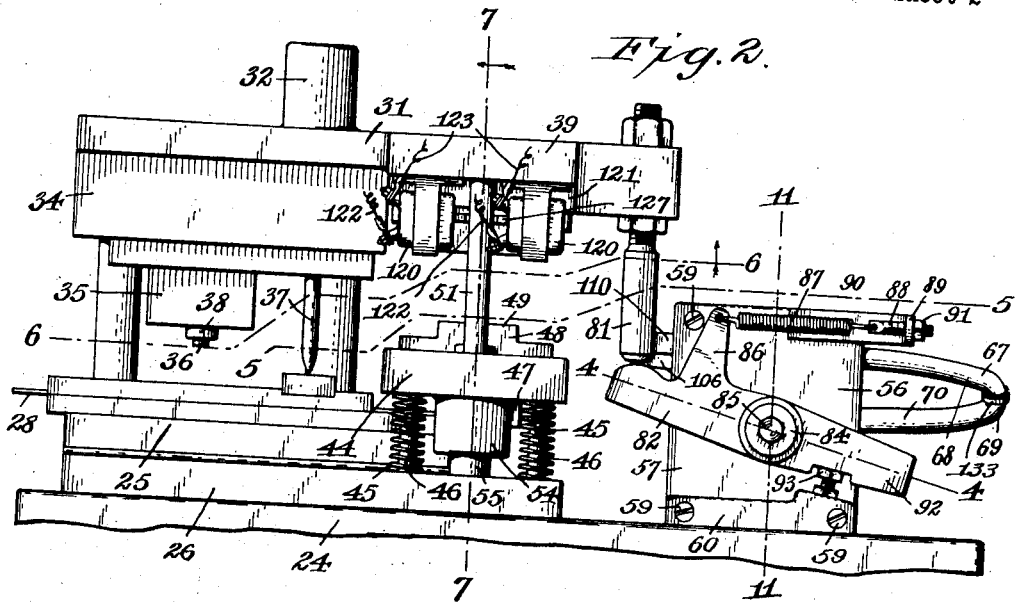
Fig. 2.
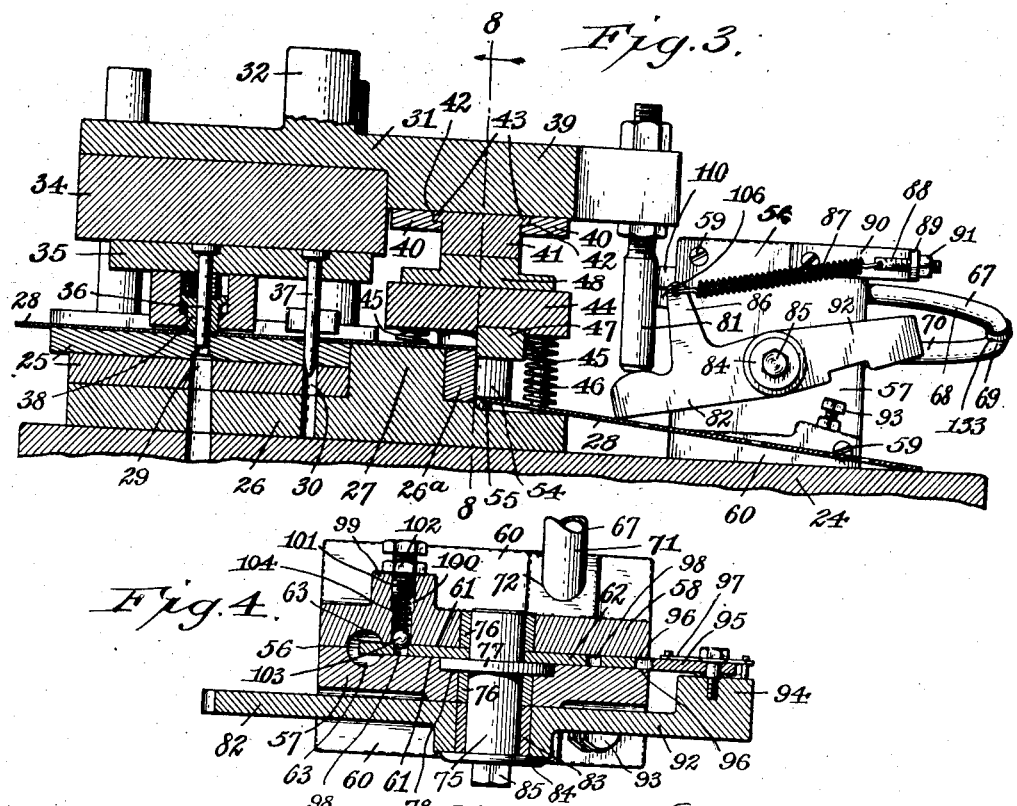
Fig. 3.
Fig. 4.
Witness
J. Oberst.
Lawrence V. Whistler, Inventor.
By Emil Kuehart
Attorney.

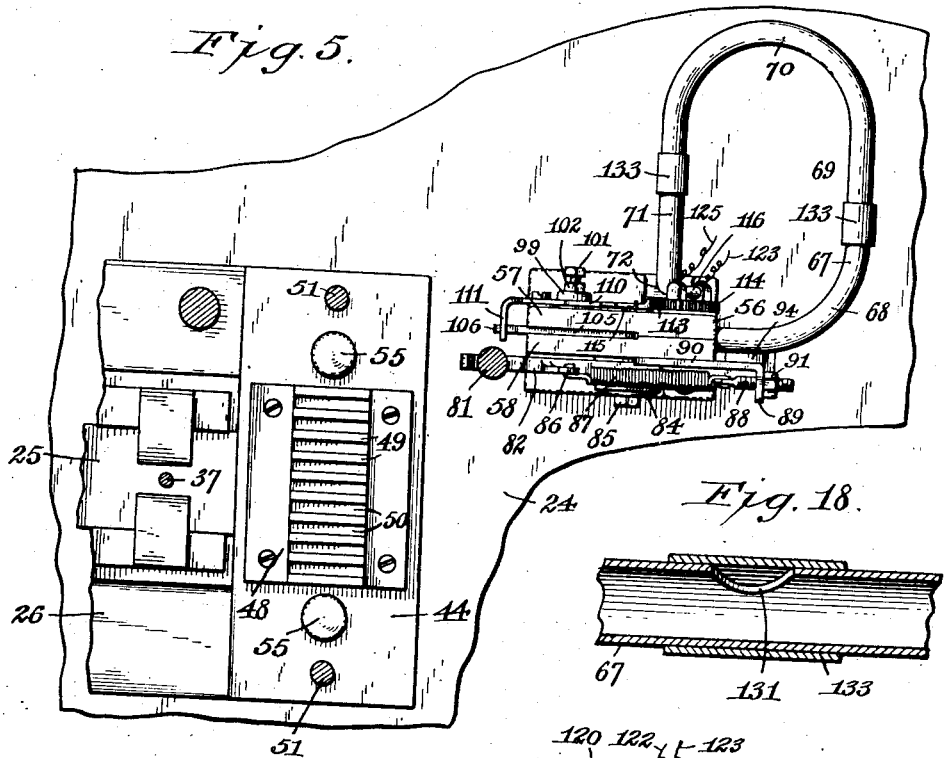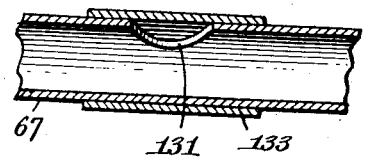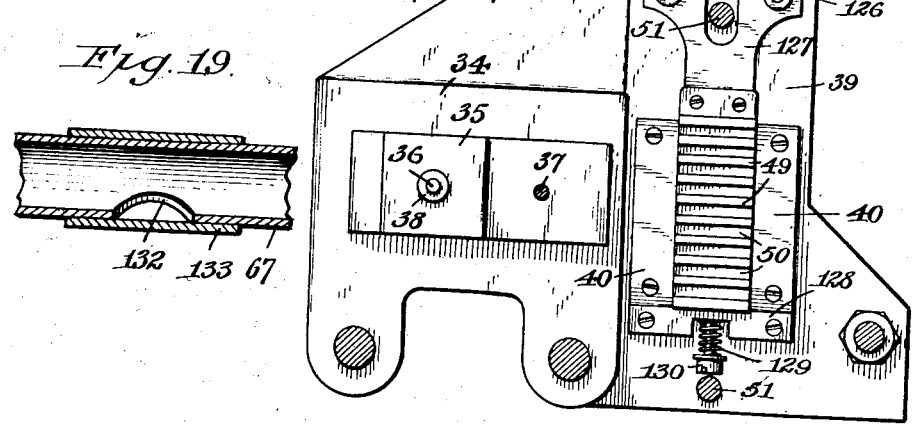

Aug. 31, 1937.					L. V. WHISTLER					2,091,724
					OPERATION STEP CONTROLLER
					Filed Jan. 31, 1936				5 Sheets—Sheet 4
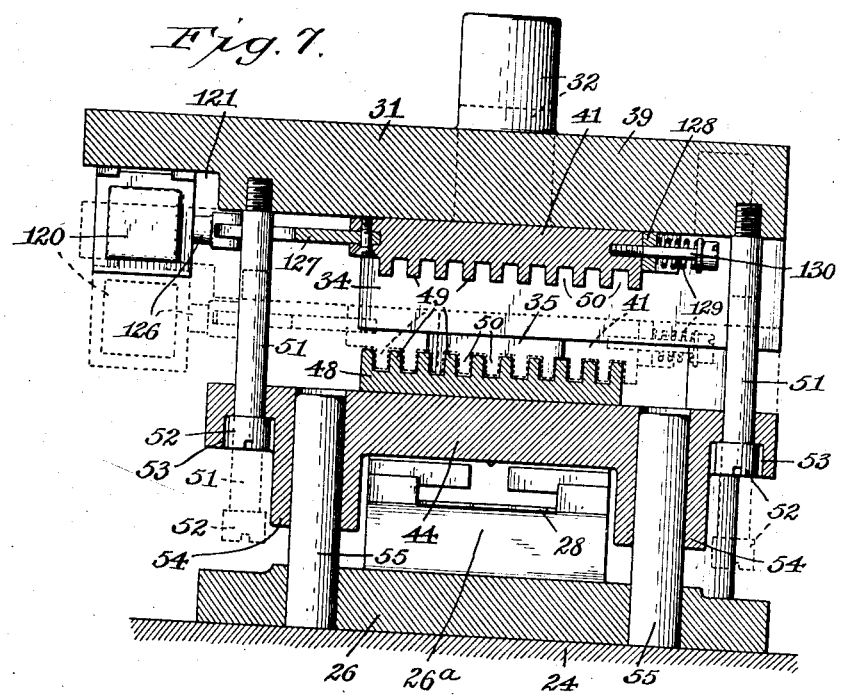
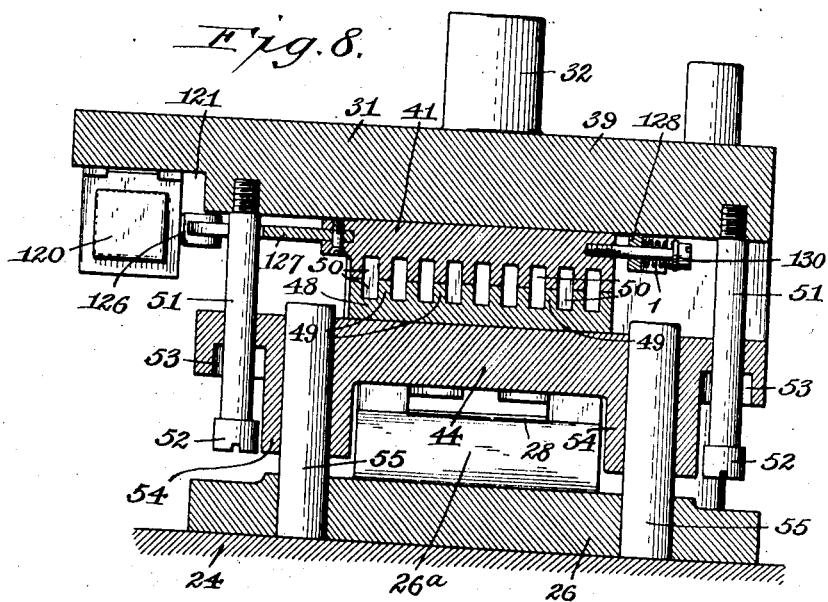
Lawrence V. Whistler, Inventor.
Witness:
J. Oberst.
By Emil Kunhart
Attorney.

Aug. 31, 1937.  L. V. WHISTLER  2,091,724
OPERATION STEP CONTROLLER
Filed Jan. 31, 1936  5 Sheets-Sheet 5
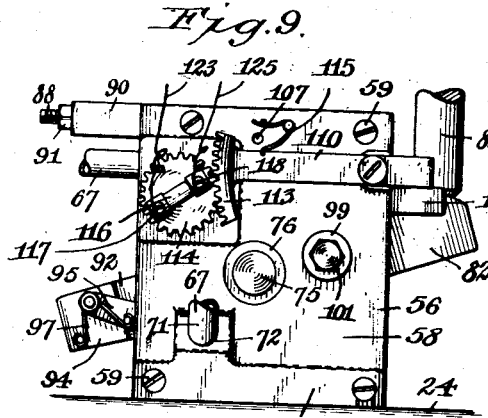
Fig. 9.
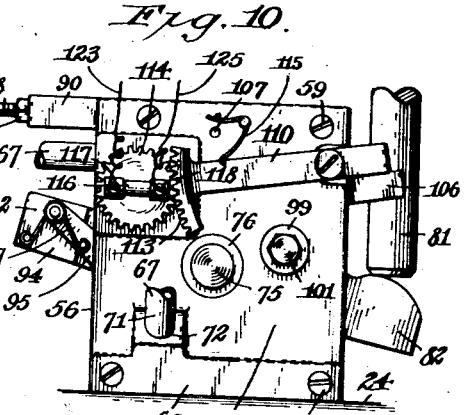
Fig. 10.
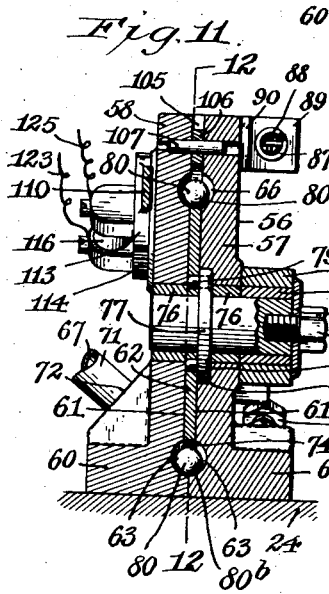
Fig. 11.
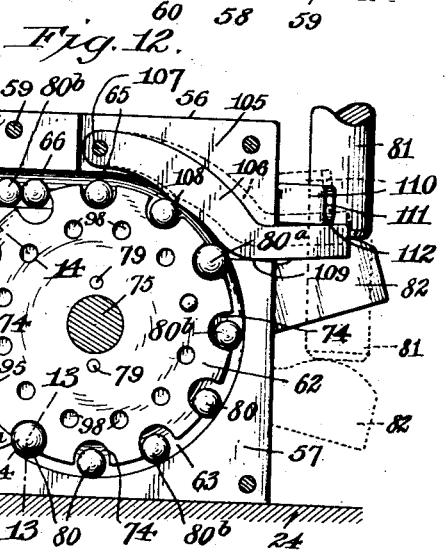
Fig. 12.
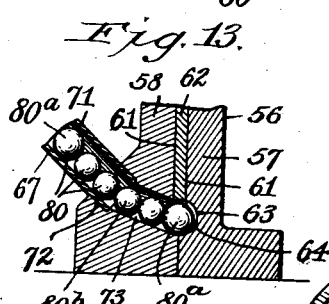
Fig. 13.
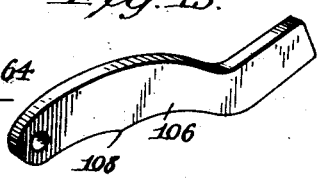
Fig. 14.
Fig. 15.
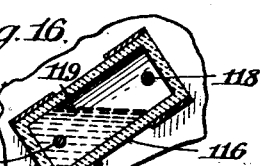
Fig. 16.
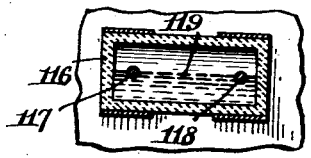
Fig. 17.
Lawrence V. Whistler, Inventor
By Emil Neuhart
Attorney.
Witness:
J. Oberst.

Patented Aug. 31, 1937

2,091,724

UNITED STATES PATENT OFFICE 2,091,724

OPERATION STEP CONTROLLER

Lawrence V. Whistler, Kenmore, N. Y.

Application January 31, 1936, Serial No. 61,837

6 Claims. (Cl. 101—3)

This invention relates to a step-control device for operating machines, and may also be more specifically referred to as a variable gauge-device for various types of operating machines, such as weaving machines, printing presses, and counting machines, and particularly stamping presses.

The primary object of my invention is the provision of an improved variable step-control device for operating machines of various kinds, whereby for example, in weaving machines, the woven material may be marked, stitched, printed, or stamped at desired intervals to indicate units of measurement; whereby in printing machines, especially machines for printing wall-paper, the paper or other article printed may be stamped at regular intervals; whereby in counting machines the articles counted may be manipulated in any desired manner at regular intervals; and whereby in stamping presses the metal being blanked, pierced, trimmed, punched, notched, corrugated, embossed, or otherwise shaped or fashioned may be cut off or otherwise specially manipulated after such operation has taken place along any predetermined length of the metal.

Another object of my invention, as particularly applied to a sheet-metal operating-press, is the provision of a variable cut-off device controlled by units insertable into or removable from the device, and which serve as the controlling medium for determining the instant at which the cut-off operation is to be effected.

Another object of my invention is to provide a device of the kind mentioned which comprises electrically-controlled mechanism for placing into action, in an operating machine, a cut-off or other serving-medium, and in associating therewith a variable control-device under control of which a make-and-break device associated with said electrically-operated mechanism is actuated; whereby at any desired instant, time, dimension of the stock in at least one direction, or the number of objects passing through a machine can be definitely gauged.

A still further object of my invention is to provide a control-device for cut-off or other serving-mediums, including a series of balls or other units of at least two variations movable along a given path, preferably variations in diameter, or at least in dimension in a given direction.

A still further object of my invention is to provide as mechanism of the kind described, a control-device including a series of spherical elements of two different diameters insertable into and removable from said device to vary the intervals between the larger of said spherical elements and to employ said larger spherical elements as the initial actuators of the mechanism.

The invention consists, basically, in a step-control device for operating machines of various kinds. Generically it serves as a variable serving-medium under initial control of a series of individual units changeable to vary the intervals of effectiveness of said serving-medium; and more specifically, in an automatic variable cut-off mechanism, including a traveling series of units of two different dimensions capable of being changed in their co-operative relation, the units of the larger dimension, at least in one direction, being adapted to operate means whereby the serving-medium is placed into action.

The invention further consists in a control-device associated with a serving-medium or serving-mechanism and which includes a series of spherical units on two different diameters capable of being employed in any co-operative relation to bring the larger units into effective use at desired intervals, and to employ said larger units as the means for setting the serving-mechanism into effective operation.

The invention further consists in the novel features of construction and in the arrangement and combination of parts to be hereinafter described and more particularly pointed out in the subjoined claims.

In the drawings I have shown my invention as applied to a sheet-metal press, such application being illustrative only, and its application to other machines having two relatively movable parts will therefore be apparent.

Referring to the various figures in the drawings,—

Fig. 2 is a front elevation of parts of a stamping press directly associated with my improved mechanism, the reciprocating die head being shown in elevated or inoperative position with the various parts of the cut-off mechanism in their relative positions.

Fig. 3 is an enlarged transverse vertical section taken on line 3—3, Fig. 1, showing the die in operating position.

Fig. 4 is an enlarged cross section through the control-device taken on line 4—4, Fig. 2.

Fig. 5 is a horizontally trending section taken on line 5—5, Fig. 2.

Fig. 6 is a horizontally-trending section taken on line 6—6, Fig. 2, looking up or in the direction of the arrow crossing said line.

Fig. 7 is a vertical section taken on line 7—7, Fig. 2, looking in the direction of the arrow crossing said line.

Fig. 8 is a vertical section taken on line 8—8, Fig. 3, looking in the direction of the arrow crossing said line.

Fig. 9 is a side view of the control-device showing the exterior movable parts in the position they assume when the reciprocating die head or ram is in its elevated position.

Fig. 10 is a similar view showing the exterior movable parts in the position they assume when the reciprocating die head or ram is in its lower or operating position.

Fig. 11 is an enlarged vertical section taken on line 11—11, Fig. 2.

Fig. 12 is a vertical section taken on line 12—12, Fig. 11.

Fig. 13 is a substantially vertical section taken on line 13—13, Fig. 12.

Fig. 14 is a substantially horizontal section taken on line 14—14, Fig. 12.

Fig. 15 is a detached perspective view of the primary actuator lever forming part of the control-device.

Fig. 16 is a longitudinal section of the thermoid switch in the position it assumes when the cut-off medium is maintained inoperative.

Fig. 17 is a similar view showing the thermoid switch in the position it assumes when electrically setting the cut-off medium into action.

Fig. 18 is an enlarged longitudinal section of a portion of the ball tube along an area having a ball-inlet formed therein.

Fig. 19 is a similar view of the ball tube along an area having a ball-outlet formed therein.

Figure 1:
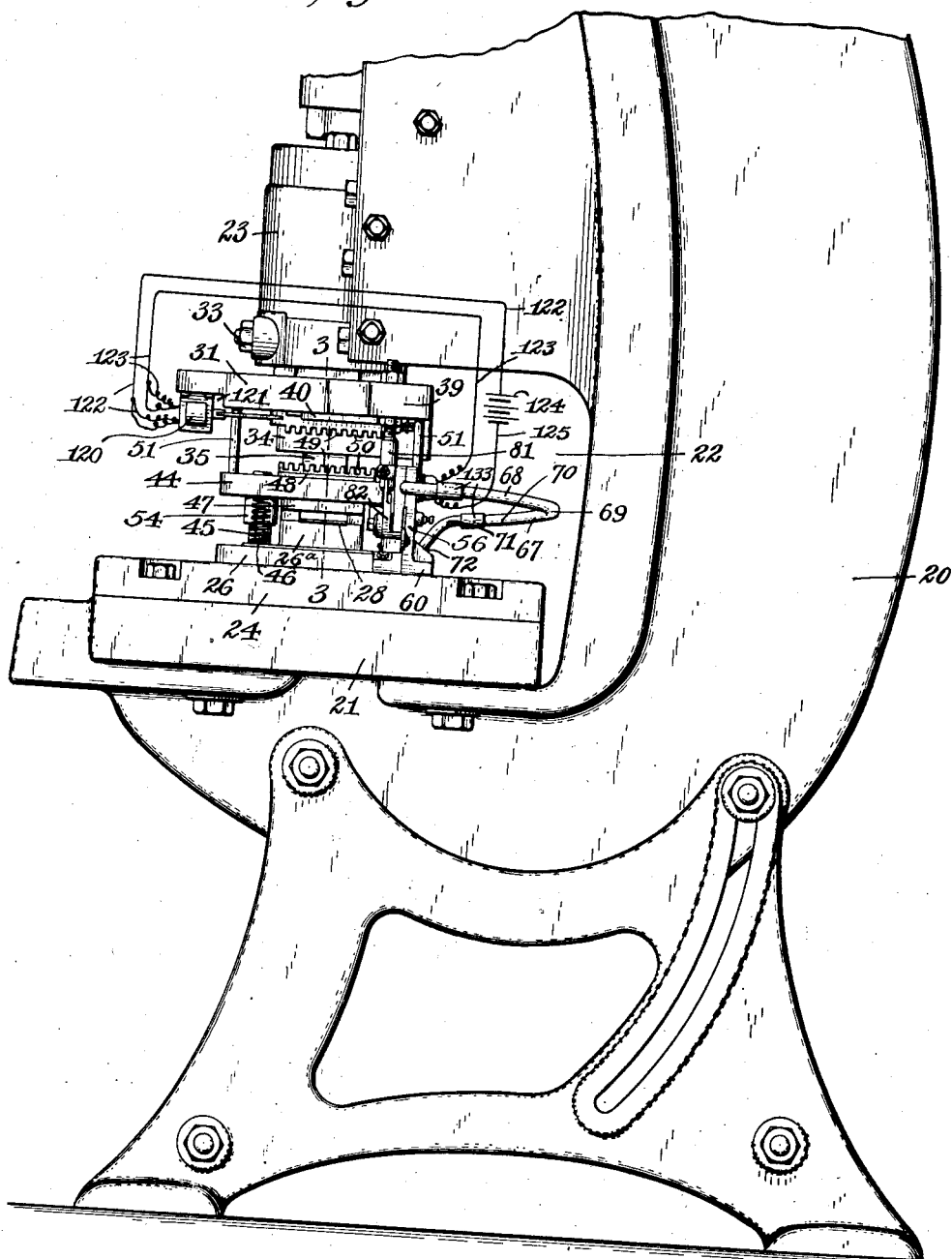
Fig. 1 is a side elevation of the lower portion of a stamping press, such as is in common use for manipulating sheet-metal of various kinds, the same being equipped with my invention.

While I have illustrated my invention as applied to a metal-stamping press, there are many forms of operating machines to which this invention may be applied for effecting, at regular or irregular intervals, some operation other than the primary operation for which the machine is designed. For example, when printing newspapers, the control-device may be set or adjusted to enable the papers to be arranged in stacks or bundles, each having a given number of papers, or if desired, to enable the papers to be arranged in stacks according to the number of papers ordered by each individual selling-agency. When applied to printing machines for printing wall-paper, matching points may be printed on the edge of the paper. A further example of the application of my invention is in connection with weaving machines, whereby the cloth woven may be distinctly stitched or marked along the edge to indicate each yard of cloth woven and to enable the seller of the bolt of cloth under yard-measurement to determine the exact point at which the cloth is to be cut without resorting to the use of measuring-machines, yardsticks, or other measuring mediums.

There are many other operating machines with which my invention may be employed to serve as a gauge to effect occasional operations in addition to those regularly performed by the machine, and while the invention is designed for use in connection with all forms of operating machines to effect some desirable operation at intervals, regularly or irregularly, it is primarily designed for use in connection with metal-stamping presses.

Sheet-metal is oftentimes fed through stamping presses from a reel or in the form of comparatively long sheets, and such metal is variously operated upon, for example, such as forming perforations in the metal at regular or irregular intervals with one or more punches. Sheet-metal is oftentimes stamped to form depressions and elevations therein, to create fins, and to otherwise fashion the metal in various ways. Any of the various operations resorted to invariably require severance of the metal in order that a metallic part or object of the desired size and finished or partly finished form be delivered from the press.

Assuming an order of various sets of such stamped pieces is to be filled, in which the pieces of each set vary in length, and in which each piece is provided with regularly-spaced rectangular transversely-disposed elevations varying in number according to the length of the piece, the control-device of my invention is equipped with control units arranged to effect the severance of the metal according to the various lengths required in each set of pieces.

Again assuming one piece so stamped to be twelve inches in length, a second, ten inches in length, and the additional pieces diminishing successively two inches in length until the last piece of the set stamped by the press is only two inches in length, the dies employed may be formed to fashion the required number of transverse elevations on the piece two inches in length under a single operation of the press; whereas the piece twelve inches in length will require six operations of the press and of course the step by step feeding of the sheet-metal through the press to create the transverse elevations along the length of a twelve inch piece. With this in mind the control-device is arranged so that the metal will be severed to form a two inch piece under a single operation of the press; the two inches being severed from the metal during the time that the press is operating on the adjacent portion of the metal to form the four inch piece, which will require two operations of the machine, and of course a step by step movement of the metal through the press. Under the first operation-step upon the six inch piece to be formed, the four inch piece will be severed from the metal, and after three step-operations of the press, the six inch piece will be completed; this being continued until the piece of greatest length is formed, whereupon the next set of pieces will be brought to the operation point under automatic control of my improved control-device.

It is, of course, to be understood that, in filling an order for numerous sets of pieces in which the pieces in the sets vary in size, my control-device may be adjusted or set to stamp all pieces of a given size and then readjusted or set to stamp corresponding pieces of a different size; such readjusting or resetting being made for the remaining varying sizes of the sets to be stamped; all of which will be apparent from the descriptive matter to follow.

Now referring to the drawings in detail in the form in which my invention is illustrated in connection with a stamping press, and from which there will be little or no variation with reference to its application to any other form of operating machine, the numeral 20 designates the frame of the press, on which is formed or to which is secured the bed plate or table 21, and which has a yoke or gap 22 in which the punches or dies for effecting operation of sheet-metal are arranged. The upper portion of this yoke forms a forward extension on the main portion of the frame, and in it is supported and guided for vertical reciprocation, the usual head 23 which carries the punches or dies associated with dies on a die-plate 24 mounted and secured on the bed-plate or table 21.

In the drawings I have shown a die 25 which may be secured to the die-plate 24 through an intermediary 26, or directly if desired. The intermediary 26, as best shown in Fig. 3, is preferably provided for fixation of a cutter bar 26ª thereto, as will appear hereinafter, and for this reason I prefer to use such an intermediary, which may more particularly be referred to as a die-holder and to which dies of various kinds may be attached, depending on the particular operation to be performed. The die 25 I term the lower or stationary die and it is formed of two contiguous parts, best shown in Fig. 3, which is set into a depressed portion of the die-holder and secured thereto in any approved manner. The die-holder may have an elevated portion 27, the upper face of which is flush with the upper face of the die 25 so that the sheet-metal, designated by the numeral 28, may be moved through the press while in contact with the die, the elevated die portion and a cutter bar 26ª secured to that side of the elevated portion of the die-holder opposite the die 25.

Depending on the nature of the operation to be performed on the sheet-metal, the die will, of course, vary in shape. I have, however, shown the die 25 provided with a punch-hole 29 and a guide hole 30.

Secured in any approved manner to the vertical reciprocating head 23 is a head or ram-plate 31. This head or ram-plate may have an upstanding boss 32 which is inserted into the vertically reciprocating head 23 and fastened therein by means of bolts 33 or otherwise. The head or ram-plate 31 is recessed on its under side to receive a die or punch-block 34 which is secured thereto and to which is secured a die or punch-holder 35 carrying a punch 36 adapted to be drawn through the sheet of metal and enter the punch-hole 29 in the lower or stationary die 25.

The die or punch-holder 35 also carries a placer or guide-pin 37 which is designed to enter the perforation formed in the sheet-metal under the previous operation of the press, so that the point at which the punch is to perforate the sheet-metal will be the exact distance from the previous punch-hole in the metal desired for the particular piece of work operated upon. To establish this, the placer or guide-pin 37 is longer than the punch 36, and its lower end is pointed so that it will engage the wall of the previously formed perforation in the sheet-metal should the latter be improperly positioned, so as to assure the punching of the next perforation in the metal the exact desired distance, center to center, from that beneath the placer or guide-pin or in which said pin is entered, the pointed end of the latter serving to shift the metal so as to accomplish this. Associated with the punch 36 is a stripper 38.

These parts merely illustrate dies employed for perforating a strip of metal of a given length by having the perforations therein the desired distances apart, and as arranged, four perforations are to be made before severance of the metal takes place, as clearly shown in Fig. 3.

It will of course be apparent from the foregoing that any other form of metal-operating die or device may be substituted for the punch, and that any other form of metal-positioning means may be employed for determining the exact movement of the sheet-metal through the press for positioning the same, step by step, for the successive operations, in lieu of the placer or guide-pin 37.

I have shown the head or ram-plate 31 provided with a lateral extension 39, on the under side of which are arranged spaced-apart guides 40 which hold a gag or rack-bar 41 slidable on said plate, the guides being grooved, as at 42, along their inner edges to receive guide flanges 43 formed on the gag or rack-bar. This gag or rack-bar, in the particular adaptation of my invention shown, is slidably movable forwardly and rearwardly on the press, but may be otherwise arranged, depending on the particular form of press to which the invention is applied, or on the particular operation to be performed. These guides and the gag or rack-bar form an assembly beneath which a spring-supported cutter-table 44 is arranged, which is supported by spiral springs 45, the lower portions of which surround rods or studs 46 rising from the die-holder 26. This cutter-table has a cutter-bar 47 recessed into its lower side and adapted for shearing co-action with the cutter-bar 26ª fastened to the elevated portion 27 of said die-holder.

Screwed to the upper side of the cutter-table 44 is a gag or rack-bar 48 adapted both for inter-meshing and abutting co-action with the gag or rack-bar 41. Each of these gag or rack-bars, as best shown in Figs. 7 and 8, have a longitudinal series of transversely-disposed teeth 49 forming intervening spaces or grooves 50 which are slightly wider than the teeth of each rack bar; and to assure perfect vertical movement of the gag or rack-bar 48, guide-pins 51 are threaded into the lateral extension of the head or ram-plate 31 and depend therefrom, said guide-pins having stops 52 in the form of heads which are designed to enter pockets 53 at opposite ends of the cutter-table, which, by engaging the inner end walls of said pockets determine the downward movement of said cutter-table. The latter is also provided near opposite ends with downwardly-extending bosses 54 to provide elongated openings for guide rods 55 extending upwardly from the die-holder 26.

It will be apparent that the gag or rack-bar 41 is movable with the punch or upper die member of the stamping press, and therefore this gag or rack-bar may be fastened to the vertically reciprocating head 23 or any portion of the press movable therewith.

The cutter-bars 26ª and 47 serve, in the particular illustration of my invention, as a means of severing the sheet-metal after operating upon the same over any desired region, and they may therefore be basically referred to as serving-means, which term can be applied to any operating machine wherein a particular mechanism, device, or medium is provided to intermittently effect a definite operation, either at regular or irregular intervals, according to the arrangement of my improved control-device, to be hereinafter more particularly set out.

It will be understood that thus far I have described operating mechanisms in the form of parts inserted into a sheet-metal stamping press and serving-mechanism cooperating with said operating mechanism and by means of the gag or rack-bars causing an individual or separate operation coincident with each operation of the operating mechanism, or at regular or irregular intervals after a plurality of actuations of the operating mechanism.

Since the gag or rack-bar 48 is fastened to the cutter-table 44 and the latter is arranged for vertical movement only, the positions of the transversely-disposed teeth 49 and the intervening spaces or grooves 50 thereof are at all times maintained in the same vertical planes; movement in a horizontal plane of this gag or rack-bar being prevented by the guide-pins 51 and the guide rods 55. Normally the transverse teeth or ribs 49 of the upper gag or rack-bar 41 are in vertical alinement with the transverse spaces or grooves 50 in the lower rack-bar or teeth; and when so positioned and the sheet-metal is operated upon, the upper rack-bar moves toward and from the lower rack-bar without causing vertical movement of the latter or the cutter-table supporting the same, due to the fact that the teeth or ribs 49 of the upper rack-bar 41 enter the transverse grooves 50 of the lower rack-bar with sufficient clearance between the two rack-bars to prevent movement of the lower rack-bar, and consequently movement of the cutter-table 44 and the cutter-bar 47 attached thereto. Under such conditions clearance is provided between the two cutter-bars 47 and 26ª to permit the portion of the sheet-metal already operated upon to pass freely between them.

I, however, provide automatic control-mechanism to effect shifting of the upper gag or rack-bar 41 with a view of vertically alining the teeth or ribs 49 thereof with those of the lower rack-bar 48. When the gag or rack-bar 48 is in its normal position, the final portion of the downward movement, which coincides with that of the punch or upper die-member inserted into the press, will bring the upper gag or rack-bar in intermeshing relation with the lower gag or rack-bar, as clearly shown by dotted lines in Fig. 7. When, however, the teeth or ribs of the two gag or rack-bars are vertically alined, the downward movement of the upper gag or rack-bar will result in the under faces of the teeth or ribs of the same engaging the upper faces of the teeth or ribs on the lower gag or rack-bar, as shown in Fig. 8, such alinement being maintained during the final movement of the punch or upper die-member, and necessarily the vertical reciprocating head 33 of the press to which they are secured. This results in the cutter-table being lowered, and as this table supports the cutter-bar 47, the latter moves with shearing action along the cutter-bar 26ª fastened to the intermediary or die-holder 26, thereby effecting severance of the sheet-metal material at the desired point.

During the downward movement of the cutter-table 44 the springs 46 supporting the same are compressed, and during the initial portion of the upward movement of the upper gag or rack-bar the teeth of both gag or rack-bars are maintained in contact under the expansion of the springs 45, until the stops 52 on the guide-pins 51 come in contact with the inner walls of the pockets 53 in the cutter-table, after which the upper rack-bar continues its upward movement independently of and out of contact with the lower gag or rack-bar.

To cause the upper rack-bar 41 to move into operative position, I employ an automatic control-device which is electrically connected with a solenoid or solenoids, or any other electrically operated device connected with the upper gag or rack-bar. The control-device employed comprises a casing 56 which, in the form shown, is constructed of two parts 57, 58 screwed or otherwise fastened together, as at 59. Each of these parts, in the form shown, are comparatively flat members having base portions 60 at their lower ends to provide a solid footing for the device, and this, if desired, may be secured to some fixed part of the press, preferably the die-plate 24. The two parts 57, 58 lie in contact with each other and each has a flat circular recess 61 in its contacting face, which together form a circular pocket to receive an intermittently rotatable disk or carrier 62. The inner faces of the two parts 57 and 58 are also provided at the periphery of the so formed pocket with a parti-circular semi-cylindrical groove 63, commencing at the point 64 and extending partly around said pocket to a point 65, where it continues in substantially horizontal form, as at 66, to the edge of the casing. These semi-cylindrical grooves form a ball-track or raceway. Connected to the outer end of the horizontal portion of this ball-track or raceway is a ball tube 67, which, as best shown in Fig. 5, is curved laterally outside of the casing, as at 68, thence directed laterally any desired distance, as at 69, and recurved, as at 70, to form a return portion 71 which is entered into the casing at a low point, as at 72, the casing having at this point a ball passage 73 which connects the last-mentioned end of the tube 67 with the ball-track or raceway 63 in the casing at the point 64 indicated in Fig. 12, which point may be termed the entrance terminal of said ball-track or raceway.

The disk or carrier 62 is of flat formation, preferably stamped of heavy sheet-metal, and of a thickness slightly less than the width of the pocket in the casing into which it is placed. It is also of somewhat larger diameter than the said pocket so that it extends with its peripheral marginal portion into the ball-track or raceway 63. It is also provided at its peripheral edge with rounded notches 74 and is secured to a shaft 75 in any approved manner. I prefer to provide bushings 76 in the two parts of the casing 56 for the shaft.

The particular method employed by me for securing the disk or carrier 62 to the shaft 75 comprises a collar 77 formed on or secured to the shaft in any manner and recessed into a depression 78 formed in the inner face of one of the two parts of the casing. This collar is provided with pins 79 which extend therefrom and enter said pin holes.

Placed within the ball-track or raceway 63 and the tube 67 is a series of initial actuating-units in the form of metallic balls 80, certain of which are of a larger diameter than the remaining balls of the series. These balls are carried through the ball-track or raceway 63 under a step-by-step movement from the point 64, which may be referred to as the entrance point, to the horizontal portion 66 connecting the parti-circular portion of the ball-track or raceway with the tube 67. The ball-track or raceway therefore serves as a prescribed path which may of course be variously constructed, and in which the balls 80 or other unitary elements are individually and variously centered at all times. The tube 67 is inclined, at least in part, between its point of connection at one end of the edge of the casing 56 to the ball passage 73, which latter is inclined downwardly from the adjacent end of the tube to the ball-track or raceway. When, therefore, the balls reach the inclined portion of the tube they are automatically carried toward the exit end of the tube and into the ball raceway by gravity.

As they enter the ball-track or raceway 63, a notch 74 of the disk or carrier 62 will be positioned in line with the inclined passage 73, so that the first ball of the series in the ball-tube enters this notch, and upon intermittent rotation of the disk or carrier 62, which I prefer to term a unit or a ball carrier, the balls which are thus deposited in the notches of said carrier are advanced through the parti-circular portion of the ball-track or raceway and delivered into the horizontal portion 66 thereof, and from the latter into the tube 67 and by delivery through the same back to the entrance opening which the inclined passage 73 provides for the ball-track or raceway. Under each step-by-step movement of the disk or ball-carrier, the notches therein are brought successively in alinement with the entrance opening of the ball-track or raceway, and these notches successively receive these balls, one for each notch.

The means employed for intermittently rotating the disk or ball-carrier comprises a push-rod 81 fastened to the lateral extension 39 of the head or ram-plate 31. This push-rod extends downwardly from said extension and engages one end of a rock-lever 82 rockably mounted on one end of the shaft 75. Said lever is bushed, as at 83, and held against accidental displacement on said shaft by a retainer disk 84 secured to the end of the shaft by means of a screw 85 threaded axially thereinto, the hub of said rock-lever 82 having its outer end in riding contact with the marginal portion of said disk. The rock-lever 82 is provided with an upstanding arm 86 to which one end of a retractile spring 87 is secured, the other end of said spring being fastened to an adjusting screw 88 passed through a lug 89 formed on a bracket 90 fastened to the adjacent side of the casing 56. By means of this screw, which is held in adjusted position by a nut 91 bearing against the lug 89, the tension of the spring 87 may be adjusted.

The rock-lever 82 has a ratchet-arm 92 integral therewith, the lower edge of which engages an adjustable stop 93 threaded into the base portion 60 of the casing 56. This ratchet-arm extends from the hub of the rock-lever 82 in a direction opposite that of the lever proper and has an offset portion 94 at its outer end to which is pivotally mounted a ratchet-dog 95 extending into a slot in the edge of the casing 56 formed by recesses 96 in opposing faces of the two parts 57 and 58, the recesses forming this slot being in reality extensions of the circular recesses 61 formed in said faces. This ratchet-dog 95 is adapted for engagement with the disk or carrier 62, and for this purpose is associated with a trigger-spring 97 common to devices of this kind. The end of the dog, therefore, engages the wall of a peripheral notch in said disk or carrier with each cycle of movement of the rock-lever 82. During the downward movement of said lever and the upward movement of the ratchet-arm, the ratchet-dog 95 travels idly in contact with the peripheral edge of the disk or carrier 62 and moves from one notch to another, as indicated by the full and dotted lines for said ratchet-dog shown in Fig. 12. During such idle movement the sheet-metal passing through the press is subjected to an operating step, and this idle movement is effected by the downward movement of the push-rod 81.

During the upward movement of the head or ram-plate, which carries the punch or other operating element with it, the push-rod 81 moves in an upward direction, allowing the rectractile spring 87 to exert its force to draw the rock-lever upwardly while in contact with said push-rod, which results in the ratchet-arm moving in a downward direction and causing the disk or ball-carrier 62 to be moved rotatably a distance equaling that between adjacent notches therein, center to center. It will thus be apparent that during each cycle of movement of the operating elements of the stamping press, the disk or carrier is moved a distance equaling the exact distance which the notches in the same are spaced apart, with the result that an unoccupied notch in the disk or carrier is positioned to receive a ball from the ball-tube, and such delivery of the ball may result in a small ball being brought into the ball-track or raceway, or one of the larger balls, depending upon the arrangement provided for the particular operation to be performed on the sheet of metal passing through the stamping press.

It is, of course, desirable to have assurance that, when moving the disk or ball-carrier, it will be retained in its newly-adjusted position and with this in view, said disk or ball-carrier is provided with a circular series of lock-openings 98 into which a portion of a lock-device is to be pressed, the lock-device being so constructed that it will automatically release the disk or carrier when sufficient pressure is exerted on the latter by the ratchet-arm under action of the spring 87. For this purpose I prefer to provide one part of the casing 56 with an outwardly-extending boss 99 and form through the casing from the exterior of the boss to the disk a bore 100, enlarged in diameter along its outer portion to receive a regulating-screw 101 held in adjusted position by a jamb-nut 102. At the inner end of this bore a lock ball 103 is arranged which is adapted to extend partly into the successive openings in the series 98 as they are brought in alinement with said bore. In the bore between this lock-ball and the adjusting-screw an expansion spring 104 is interposed, the force of which is regulated by the adjusting screw 101.

Each of the two parts 57, 58 of the casing has on its inner side at one corner thereof a recess 105, which together form a pocket opening to the edge of the casing opposite that to which the upper end of the ball-tube 68 is secured; and in this pocket is pivotally arranged a curved trip lever 106, the curvature of which conforms more or less to the curvature of the peripheral edge of the disk or ball-carrier, over which it is positioned, and consequently to the curvature of the ball-track or raceway. The pivot 107 of this trip-lever is in the form of a pin inserted into alined openings in opposite parts of the casing and extending through one end of said lever. This trip-lever is provided with a hump 108 on its concaved edge, which extends slightly into said ball-track or raceway. The outer end of this lever extends outwardly from the casing and is disposed at an angle and in front of the curved portion thereof. The innermost position of the contact hump 108, or in other words, the extent of the entrance of said hump into the ball-track or raceway, is governed by the bottom wall of the pocket in which the lever is arranged, which wall serves as a stop, designated by the numeral 109 (see Fig. 12), and against which said lever normally rests.

When in this position, the smaller balls of the series being directed through the ball-track or raceway clear the hump 108 of the lever without contacting the same. The larger balls of the series, however, come in contact with the hump 108 and cause the lever to be elevated from the position shown in full lines in Fig. 12 to that shown in dotted lines, for a purpose to presently appear. The balls having been described as a complete series and designated by the numeral 80, I wish to stress the fact that the series comprise balls of two different sizes, the larger balls being further designated by the numeral 80$^a$ and the smaller balls by the numeral 80$^b$.

As clearly shown in Fig. 12, a large ball has been delivered into the ball-track or raceway at the entrance point and has entered one of the notches in the disk or ball-carrier 62. A distance of five notches from the notch at the entrance point is a large ball 80$^a$, which is in the act of approaching the hump 108 of the trip-lever 106, and between these two balls there is shown a set of four smaller balls, which may be termed inactive or filler balls. In said figure the ratchet-dog 95 is in its lowermost position, and during the downward movement of the punch or other operating means employed in the stamping press, this ratchet-dog will be moved idly upwardly into the position indicated in dotted lines. During the next upward movement of the punches or other operating elements employed in the press, the retractile spring 87 will come into action and cause the ratchet-dog to rotate the disk or ball-carrier 62 so as to bring the large ball 80$^a$, then underneath and still out of contact with the trip-lever 106, into engagement with the contact hump 108 of said lever and elevate the same. This ball is retained in engagement with said contact hump until the next step in the operation of the press takes place with the lowering of the punches or other operating elements employed therein.

During the next intermittent or step movement of the disk or ball-carrier, the large ball in contact with the contact hump of the trip-lever will be advanced and clear the lever, with the result that said lever will assume its lower or normal position in contact with the stop 109 of the casing. It will be clear, therefore, that due to the fact that four small balls 80$^b$ are arranged between the larger balls 80$^a$, there will be four cycles in the operation of the stamping press, which may be termed "idle cycles" as applied to the cut-off means or other serving means employed, between cycles that are effective in placing the cut-off device or other serving means into action. In the particular application of my invention illustrated, the metal will have a series of four perforations arranged lengthwise therein before the portion of the metal operated upon will be severed from the metal entering the press and positioned between the dies or other operating means employed.
Assuming that the metal is to be cut off after every second punch-hole, the arrangement of the balls within the control-device will be varied accordingly. In that case every third ball of the series 80 will be balls of the larger diameter, and if it be desired to cut off the sheet-metal operated upon successively in different lengths, the number of small balls between the larger balls will vary according to the length desired.

On one side of the casing is mounted a rack-lever 110, it being pivotally secured to said casing between its ends. This lever projects outwardly from one edge of the casing and has an angular terminal 111 which extends over the outer end of the trip-lever 106 and in engagement therewith, the lower end of this angular extension being preferably beveled to provide a sharp contact edge in engagement with the upper edge of the projecting end of the trip-lever, as shown at 112 (Fig. 12). On the inner end of this lever is arranged a segment gear 113 which is in mesh with a gear wheel 114 rotatably mounted in any suitable manner on the side of the casing 56. When the trip-lever is in its lower or normal position, the angular outer terminal 111 of the rack-lever 110 will be drawn downwardly to maintain contact therewith by the action of a spring 115 applied to the outer side of the casing 56 and acting against said rack-lever, and it is to be understood that the force of this spring will be overcome by the increased force applied to the rack-lever 82 under the action of the stamping press, with the result that when the outer end of the trip-lever is elevated the gear segment of the rack-lever 110 will be lowered, causing the gear wheel 114, as viewed in Fig. 9, to rotate clockwise. Mounted diametrically on the gear wheel and across the face thereof is a thermoid switch 116, which requires no description in view of its being one of several common forms of switches of this type, except to state that it has two contacts 117, 118 which are designed to be electrically connected together by mercury within the transparent tube of the switch, as indicated by the numeral 119. By interposing the gear-segment and gear wheel between the thermoid switch 116 and the trip-lever 106, the comparatively small movement of the trip-lever will be translated into considerable rotative movement of the gear wheel, and owing to the diametrical disposition of the thermoid switch on the gear wheel, said switch is given sufficient movement to assure a positive make-and-break device for controlling the actuation of the solenoids under all operating conditions.

When the parts are in the position illustrated in Fig. 9, this thermoid switch is obliquely disposed and a like position for the same is indicated in Fig. 16 in which connection between the contacts 117 and 118 is broken by the mercury 119. When, however, a large ball 80$^a$ is brought upwardly in the ball-track or raceway 63 into engagement with the contact hump 108 on the trip-lever 106, said lever is caused to rise and by reason of its contact with the rack-lever 110 causes said gear wheel 114 to rotate clockwise. During such action, the thermoid switch will be moved into a horizontal position, as indicated in Figs. 10 and 17, and when in this position, the mercury 119 will be brought in contact with the two contacts 117 and 118 of the switch, causing electrical connection between the two.

On the under side of the lateral extension of the head or ram-plate 31 an electrical device in the form of solenoids 120 is secured. These are spaced apart and set into depressions 121 formed on the under side of said extension. Current-conducting wires 122 connect the solenoids with a source of electricity, indicated for example at 124, Fig. 1, said source of electricity having electrical connection with one of the contacts of the thermoid-switch, say for example contact 118, by means of a wire 125. Wires 123 connect the solenoids 120 with the other contact 117 of said thermoid-switch. The cores 126 of these solenoids are connected to a yoke 127 secured to the upper gag or rack-bar 41, as best shown in Figs. 6 and 7; the solenoids being of a type to draw the cores inwardly when magnetized, thereby moving said gag or rack-bar to the left, as viewed in Fig. 7, a distance equaling the distance between the centers of two adjacent teeth or ribs on said bar, thereby positioning said teeth or ribs in vertical alinement with the teeth or ribs on the lower gag or rack-bar 48, as shown in Fig. 8.

When the solenoids are de-magnetized, the cores thereof are drawn outwardly by reason of their connection with the rack bar, which is moved to the right as viewed in Fig. 8, against a stop 128 in the form of a cross bar fastened to the under side of the extension 39 of the head or ram-plate 31. This movement is effected by an expansion spring 129 surrounding an adjusting screw 130 passed slidably through said stop and threaded adjustably into the adjacent end of the gag or rack-bar; said screw having a head or enlargement at its outer end against which one end of said expansion spring bears, while the other end thereof is in contact with the stop 128. This spring therefore serves to normally hold said gag or rack-bar 41 against said stop and also cause the cores of the magnets to be drawn outwardly by reason of their connection with said gag or rack-bar through the medium of the yoke 127.

In this particular application of my invention I employ the yoke 127 for the reason that one of the guide-pins 51 for guiding the cutter-table 44 is in the plane of this yoke, and the gap formed in this yoke permits said guide-pin to extend therethrough. In such cases, where the cutter-table is otherwise guided, or some other serving medium substituted for the cutter-bar carried by the table, any other suitable connection between the solenoids and the gag or rack-bar 41 may be employed. If desired, a single solenoid, or any other medium for operating the gag or rack-bar 41 may be substituted for the two solenoids shown.

Since the control-device is capable of use on various kinds of stamping and other operating machines, and a re-arrangement of the control-units, such as the balls 80ᵃ and 80ᵇ, will be found necessary, even as applied to a single machine, I have provided the ball-tube 68 with a supply-opening 131 which is formed on the upper side thereof and with a discharge opening 132 formed on the under side thereof, and mounted onto the ball tube so as to close said openings are slide sleeves 133 which may be moved along the tube to uncover or close said openings, when found necessary to change the ball arrangement therein.

Having thus described my invention, what I claim is:

1. The combination with an operating machine adapted to effect regular operations to produce a desired object, of a serving-medium adapted to be brought into action at intervals during said regular operations, and a control-device operatively connected with said serving-medium, said control-device including a ball-track and a series of balls movable through said ball-track, said series of balls including balls of two different diameters and being interchangeable to position those of larger diameter at any point in the series, the balls of larger diameter being adapted to engage said operative connection to cause actuation of the same for effecting actuation of said serving-medium.

2. A control-device for operating machines adapted for regular operations with a specific operation at intervals between said regular operations, comprising a casing having a ball-track therein, a ball-way connected with opposite ends of said parti-circular ball-track to form an endless ball-raceway, a series of balls interchangeably arranged within said ball-raceway and comprising balls of two different diameters, means to carry said balls through said raceway, and an element positioned adjacent said ball-raceway along which the smaller of said series of balls travels in an idle manner and against which the larger of said balls contact to cause movement of said element for controlling the specific operation of said machine.

3. The combination with a movable part of an operating machine and serving-means associated with said operating machine to effect certain operations at intervals during regular operations of said machine, of a control-device comprising a casing having a parti-circular ball-track therein and a tube connecting opposite ends of said parti-circular ball-track to form a ball-raceway, a disk rotatable within said casing and having its marginal portion extending into a portion of said ball-raceway and provided with notches, a trip-lever in said casing normally extending slightly into said ball-raceway, a series of balls arranged in said ball-raceway and comprising balls of two different diameters fed into said parti-circular ball-raceway by said tube to successively enter said balls into the successive notches of said disk, means for rotating said disk in unison with the regular operations of said machine, the smaller balls of said series passing idly underneath said trip element and the larger balls causing actuation of said trip element while passing in contact therewith, and electrically-operated means for effecting the specific operation of said machines interposed between said trip-lever and said serving-means and brought into action by movement of said trip element.

4. Means for effecting an occasional operation in an operating machine, comprising a serving-medium, a control-device actuated by said operating machine and including a series of initial actuators movable in an endless path and being of two different sizes, and operative connection between said serving-medium and said control-device adapted to be actuated only by the initial actuators of one size to cause operation of said serving-medium.

5. A control-device for operating machines to effect an occasional operation of a machine supplementary to its regular operations, comprising an element having a movable ball-carrier, a series of balls carried along a prescribed path by said ball-carrier and comprising balls of two different diameters, a movable element adapted to control the occasional operation of said machine actuated by the larger of said balls, and means to cause movement of said ball-carrier.

6. A control-device for operating machines to effect an occasional operation of a machine supplementary to its regular operations, comprising an element having a rotatable ball-carrier, a series of balls carried along a prescribed path by said ball-carrier and comprising balls of two different diameters, a movable element adapted to control the occasional operation of said machine actuated by the larger of said balls, means for rotating said ball-carrier, and an electric switch through the medium of which an electric current is established and broken under actuation of said movable element.

LAWRENCE V. WHISTLER.